(12) United States Patent
Mischel, Jr. et al.

(10) Patent No.: US 11,640,017 B1
(45) Date of Patent: May 2, 2023

(54) MIRROR WITH VANISHING INFORMATION, APPARATUS, SYSTEMS, AND METHODS

(71) Applicant: ELECTRIC MIRROR, LLC, Everett, WA (US)

(72) Inventors: James V. Mischel, Jr., Seattle, WA (US); James Vernon Mischel, Sr., Arlington, WA (US)

(73) Assignee: ELECTRIC MIRROR, LLC, Everett, WA (US)

( * ) Notice: Subject to any disclaimer, the term of this patent is extended or adjusted under 35 U.S.C. 154(b) by 505 days.

(21) Appl. No.: 16/679,177

(22) Filed: Nov. 9, 2019

Related U.S. Application Data

(60) Provisional application No. 62/758,518, filed on Nov. 10, 2018.

(51) Int. Cl.
  *G02B 5/08* (2006.01)
  *F21V 33/00* (2006.01)
  *H05B 45/10* (2020.01)
  *H05B 47/155* (2020.01)

(52) U.S. Cl.
  CPC .......... *G02B 5/0808* (2013.01); *F21V 33/004* (2013.01); *H05B 45/10* (2020.01); *H05B 47/155* (2020.01)

(58) Field of Classification Search
  CPC ..... G02B 5/0808; F21V 33/004; H05B 45/10; H05B 47/155
  See application file for complete search history.

(56) References Cited

U.S. PATENT DOCUMENTS

| | | | |
|---|---|---|---|
| 10,048,486 B1* | 8/2018 | Carneiro | G02B 5/0808 |
| 10,462,651 B1* | 10/2019 | Mischel, Jr. | H04N 21/439 |
| 10,939,522 B1* | 3/2021 | Mischel, Jr. | H05B 45/20 |
| 2016/0327787 A1* | 11/2016 | Mischel, Sr. | G02B 6/006 |
| 2018/0279454 A1* | 9/2018 | Takeshita | G03B 21/2033 |

\* cited by examiner

*Primary Examiner* — Minh D A
(74) *Attorney, Agent, or Firm* — Peloquin, PLLC; Mark S. Peloquin, Esq.

(57) ABSTRACT

Apparatuses, methods, and systems are taught that convey information in a mirror to a user. A glass layer has a front side and a back side. The glass layer further includes a first region. The first region has a first optical property. A second region has a second optical property. The first optical property is different than the second optical property. A first boundary exists where the first region meets the second region and the first boundary is shaped to convey information when the second region is illuminated from the back side and the glass layer is viewed from the front side by the user. When the second region is not illuminated from the back side the first region and the second region provide substantially the same reflection when the glass layer is viewed from the front side by the user, and the first boundary does not convey information.

33 Claims, 13 Drawing Sheets

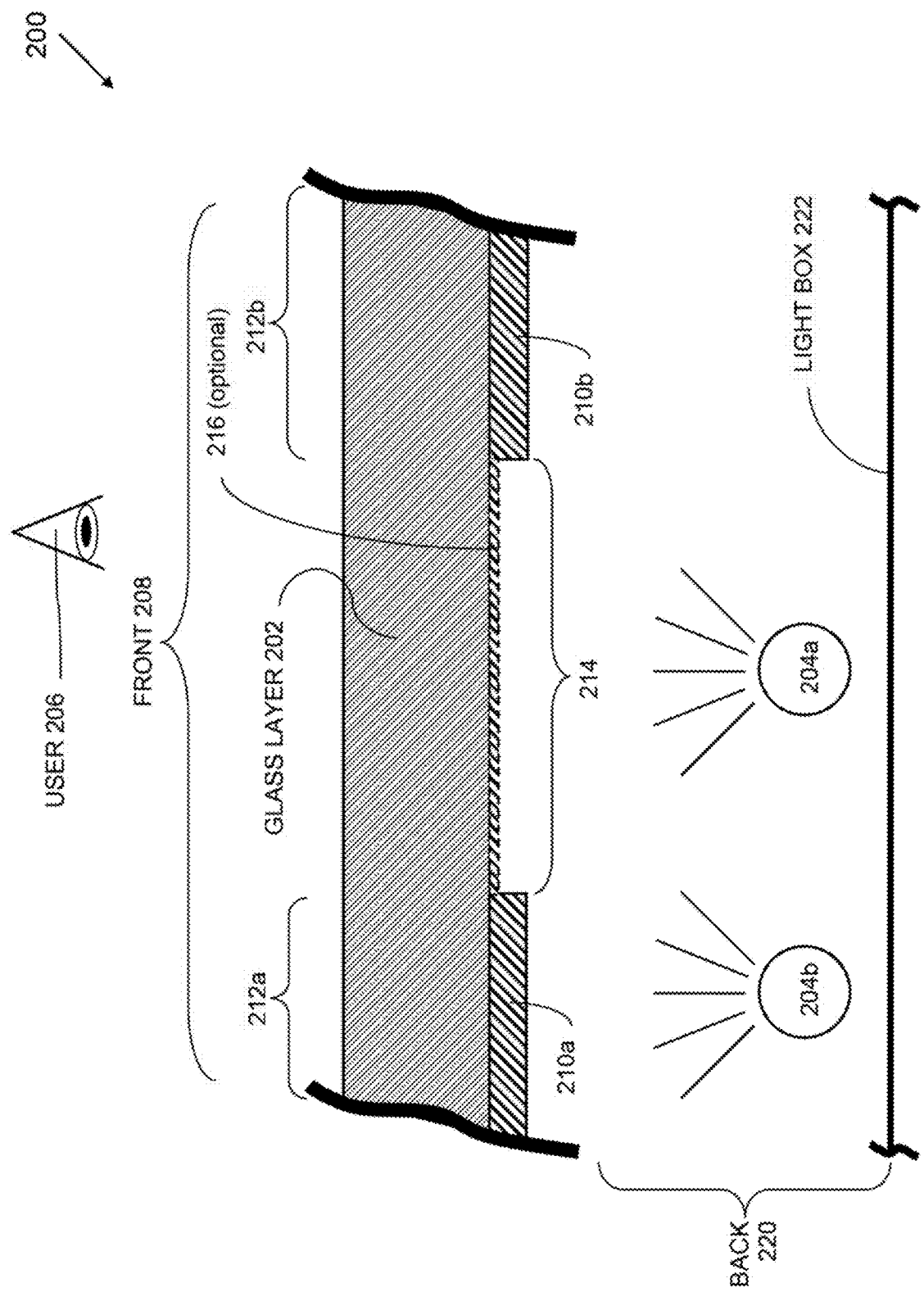

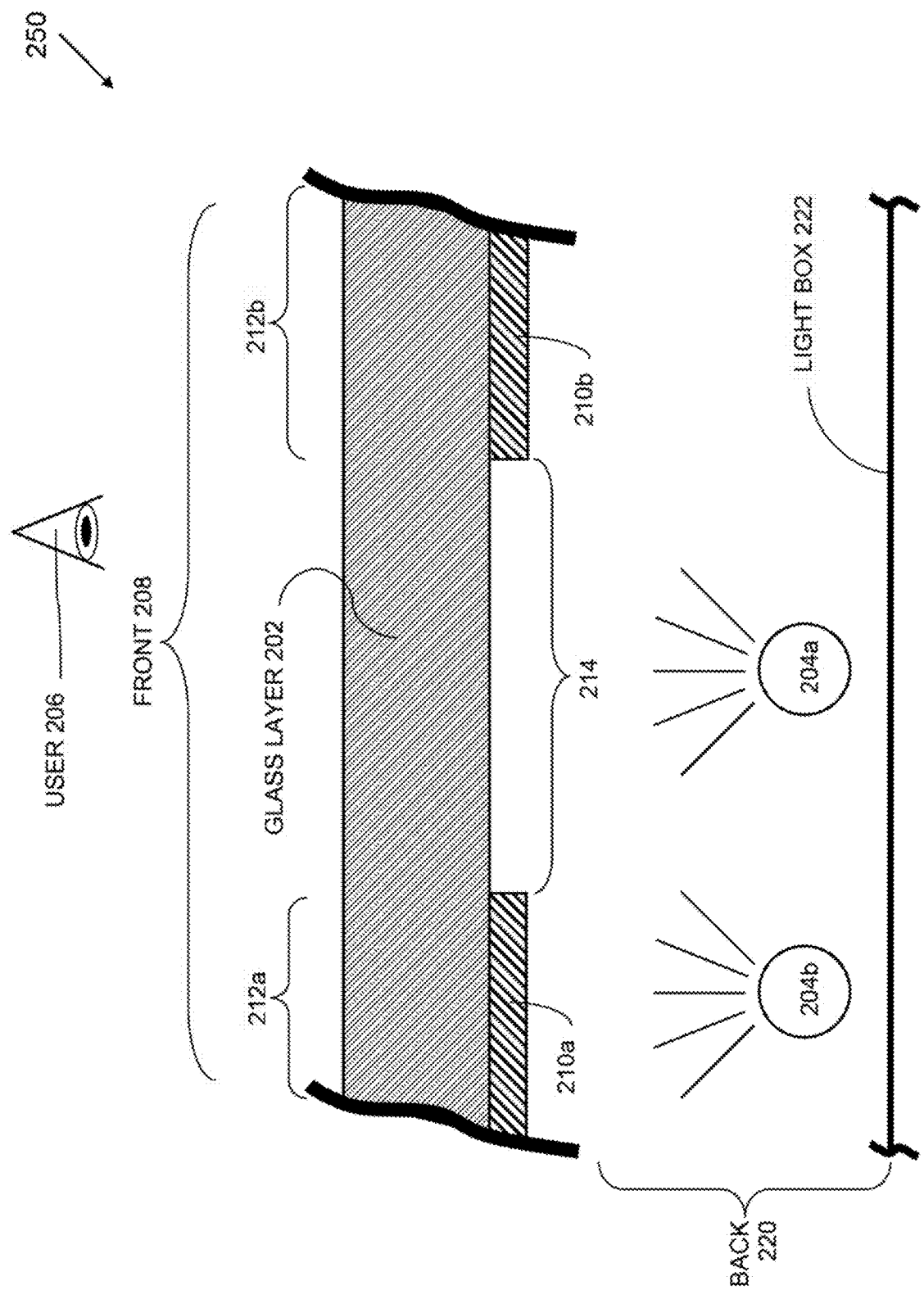

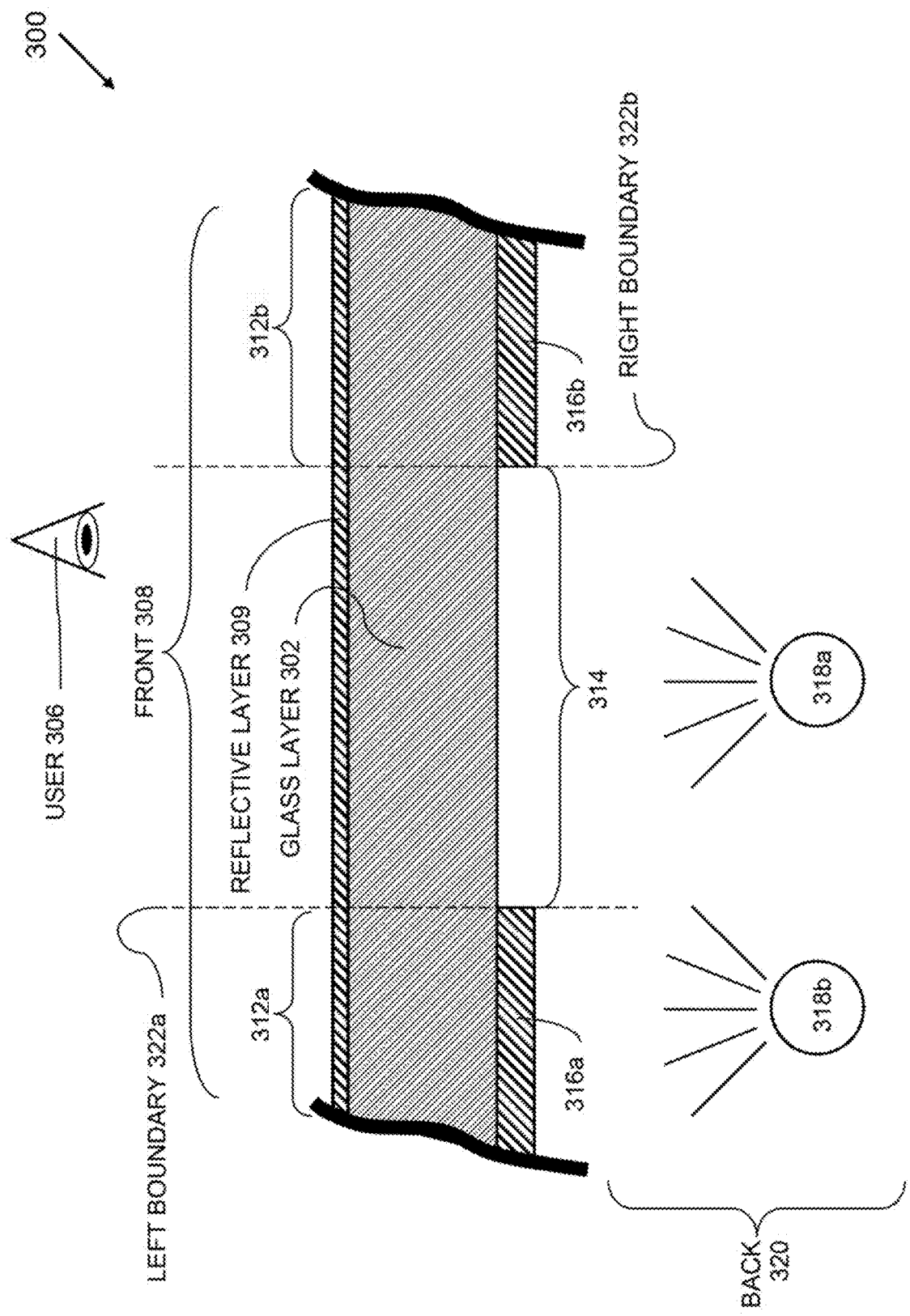

MIRROR WITH VANISHING INFORMATION, APPARATUS, SYSTEMS, AND METHODS

RELATED APPLICATIONS

This application claims priority from U.S. Provisional Patent application No. 62/758,518, filed on Nov. 10, 2018, entitled "MIRROR WITH VANISHING INFORMATION, APPARATUS, SYSTEMS, AND METHODS." U.S. Provisional Patent application No. 62/758,518 is hereby fully incorporated by reference.

BACKGROUND OF THE INVENTION

1. Technical Field

The invention relates generally to displaying information in a mirror to a user, and more particularly to apparatuses, methods, and systems for displaying the information without an information display where the information can vanish into the mirror.

2. Background

Providing a display within a mirror results in a complicated system. The resulting complex system is also expensive to manufacture and can present a challenge and expense to repair. All of this can present problems. Thus, a problem exists that requires a technical solution that uses a technical means to produce a technical effect.

BRIEF DESCRIPTION OF THE DRAWINGS

The invention may best be understood by referring to the following description and accompanying drawings that are used to illustrate embodiments of the invention. The invention is illustrated by way of example in the embodiments and is not limited in the figures of the accompanying drawings, in which like references indicate similar elements.

FIG. 2A-2B illustrate cross-sections of a glass surface configured to communicate vanishing information, according to embodiments of the invention.

FIG. 3 illustrates a second cross-section of a glass surface configured to communicate vanishing information, according to embodiments of the invention.

DETAILED DESCRIPTION

In the following detailed description of embodiments of the invention, reference is made to the accompanying drawings, in which like references indicate similar elements, and in which is shown by way of illustration, specific embodiments in which the invention may be practiced. These embodiments are described in sufficient detail to enable those of skill in the art to practice the invention. In other instances, well-known circuits, structures, and techniques have not been shown in detail in order not to obscure the understanding of this description. The following detailed description is, therefore, not to be taken in a limiting sense, and the scope of the invention is defined only by the appended claims.

In various embodiments, methods, apparatuses, and systems are described, for a glass surface that can function both as a mirror and a source of information that can vanish into the mirror. In an ON state, the system communicates information that vanishes into the mirror when the system is in an OFF state. A person views the mirror's front side. Information can be created with alpha numeric characters such as letters and numbers. Information can also be created through the use of symbols, or shapes. Notably, the information is created in the glass layer structure without an information display. In various embodiments, the information is communicated to a viewer through configuration of a boundary between a first region and a second region where a reflectivity of the first region is different from the reflectivity of the second region. The terms "viewer," "user," "person" and the like are used synonymously herein to refer to a person who views a glass surface.

Figure 1A:
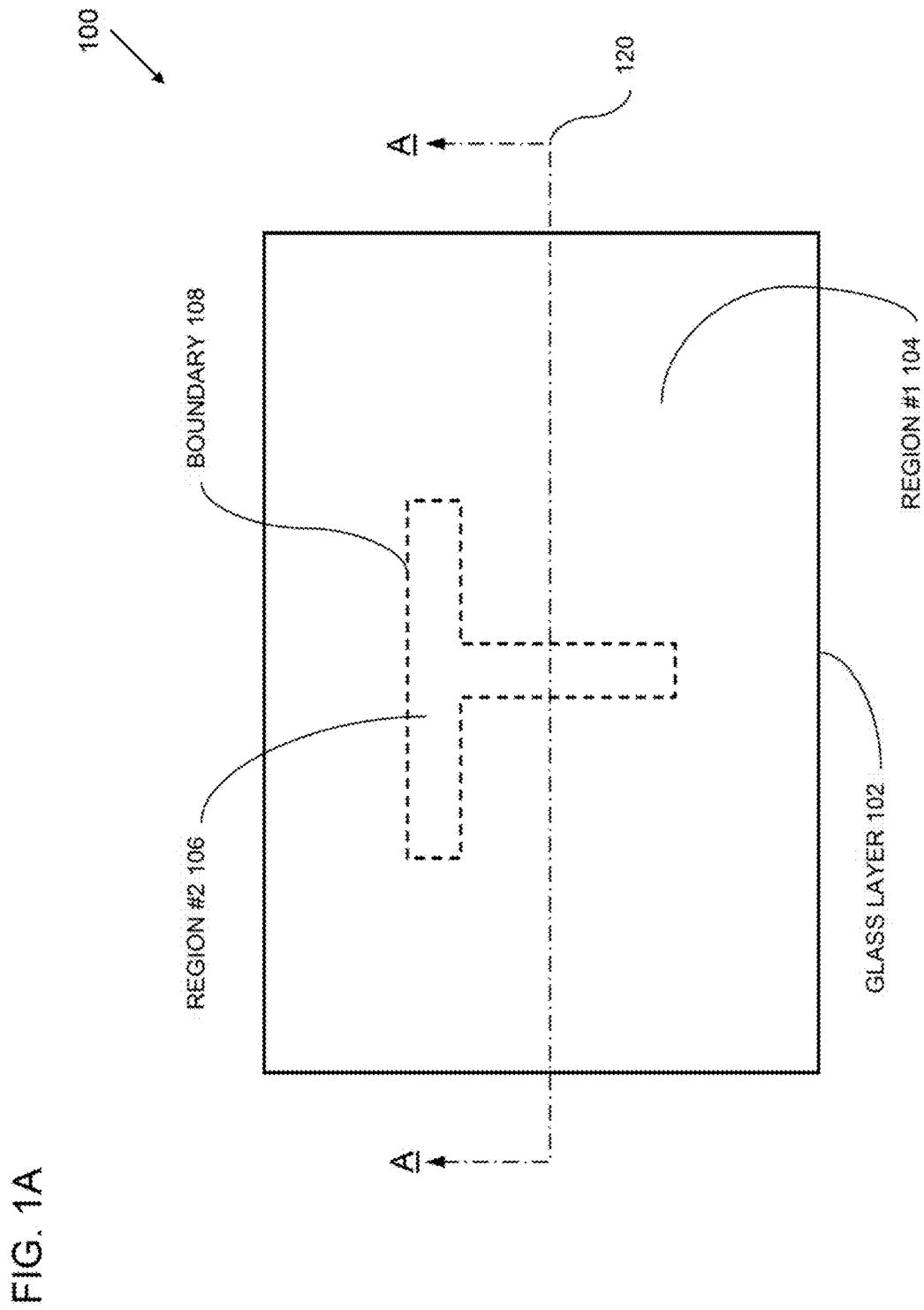
FIG. 1A illustrates an "ON" state for a glass surface configured to communicate information that can vanish, according to embodiments of the invention.
Figure 1B:
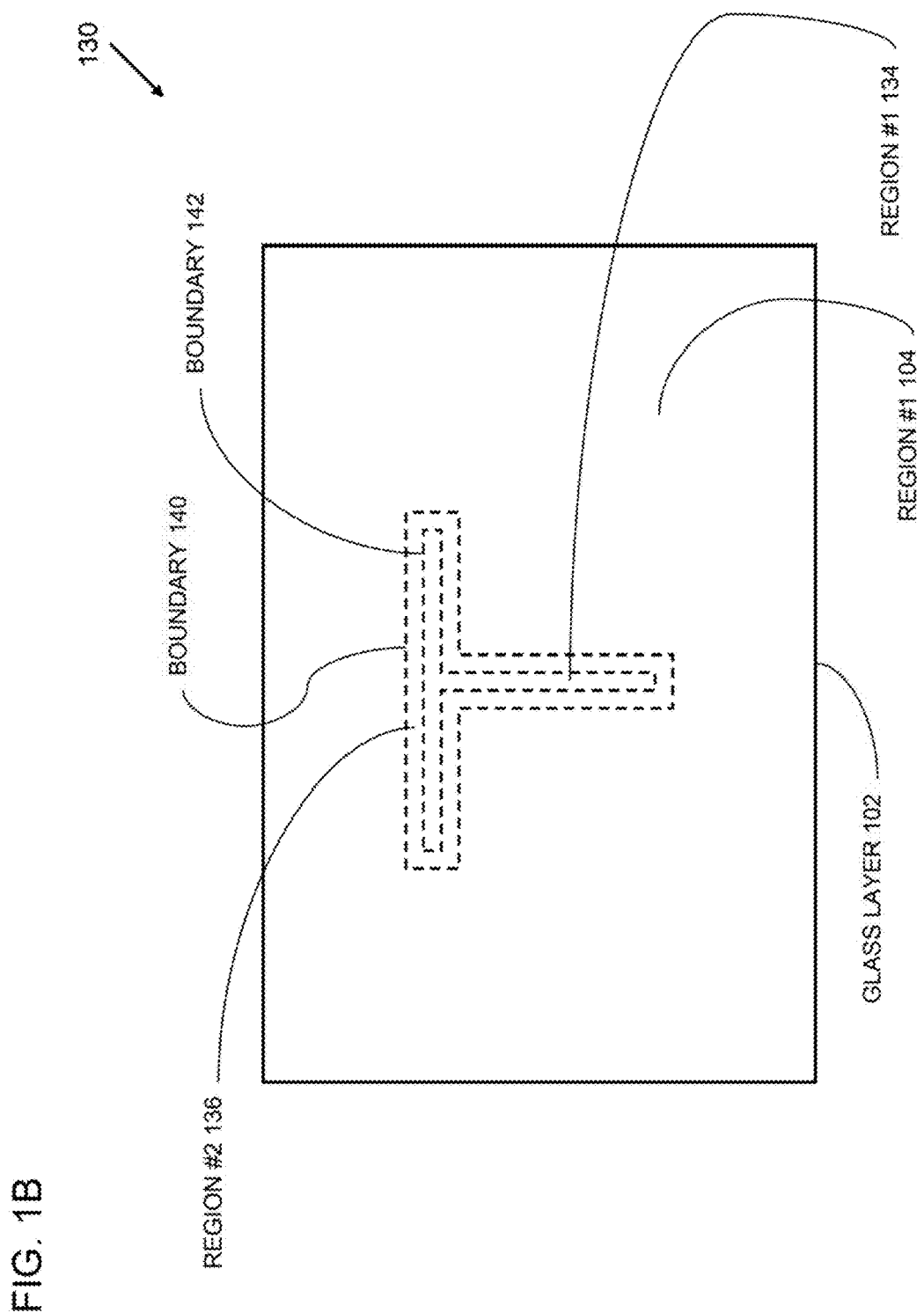
FIG. 1B illustrates another configuration of regions used to communicate information, according to embodiments of the invention.
Figure 1C:
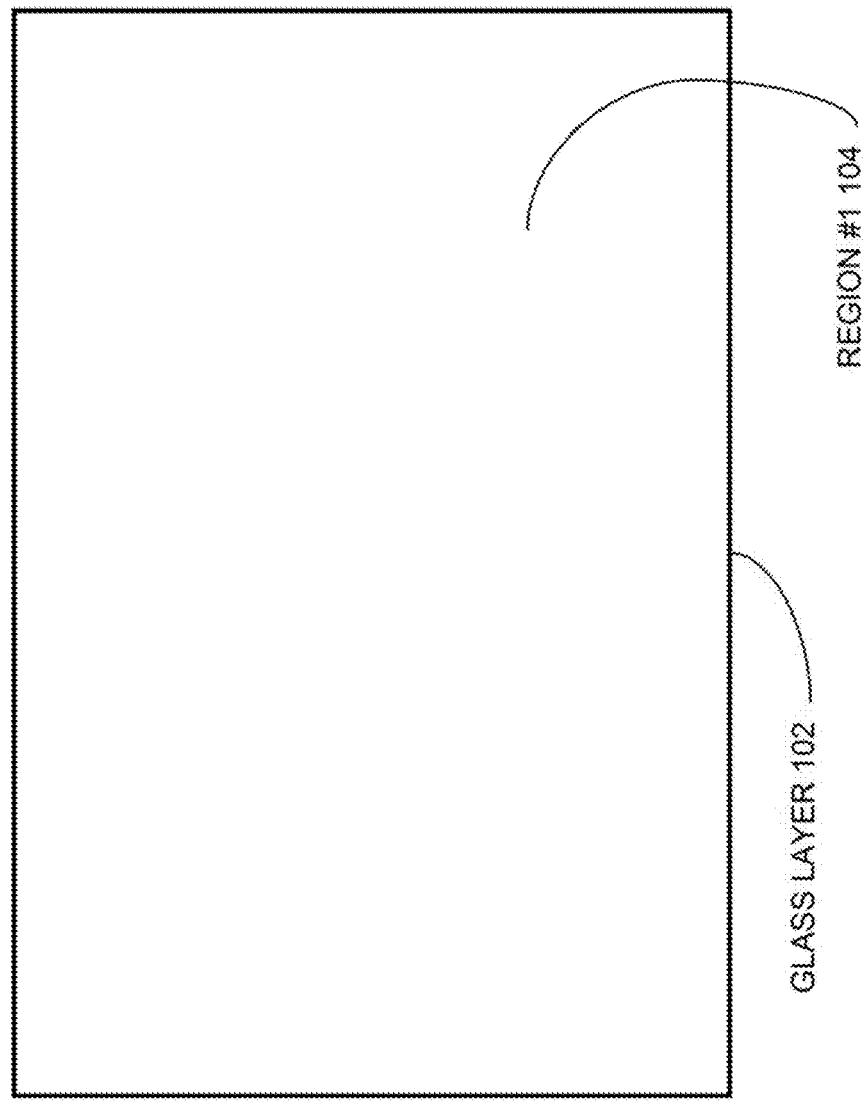
FIG. 1C illustrates the glass surface from FIG. 1A or FIG. 1B in an "OFF" state, according to embodiments of the invention.

FIG. 1A illustrates, generally at 100, a glass surface configured to communicate information that can vanish, according to embodiments of the invention. FIG. 1B illustrates, generally at 130, another configuration of regions used to communicate information, according to embodiments of the invention. FIG. 1C illustrates, generally at 160, the glass surface from FIG. 1A or FIG. 1B in an "OFF" state, according to embodiments of the invention. With reference to FIG. 1A, FIG. 1B, and FIG. 1C collectively, a front side of a glass layer 102 is illustrated. The glass layer 102 contains two regions, a first region 104 and a second region 106. The first region 104 has a first reflectivity and the second region 106 has a second reflectivity with respect to light incident from the front side. The reflectivity of the first region 104 is different from the reflectivity of the second region 106. The reflectivity of the first region can be made to be either greater than or less than the reflectivity of the second region. No limitation is implied by a selection of the relative order of the reflectivities of the regions. The requirement is that the reflectivities of the first region and the second region are made to be different. As used in the illustrations that follow, a reflectivity of the first region is made to be greater than a reflectivity of the second region. This arrangement causes the "symbol, letter, number, etc." itself to be illuminated. The reverse will cause the area around the "symbol, letter, number, etc." to be illuminated. In both cases the information i.e., the "symbol, letter, number, etc." is conveyed to an observer.

A boundary 108 exists where the first region 104 meets the second region 106. In one embodiment, shown in FIG. 1A the boundary 108 is in the shape of the letter "T." The boundary 108 is indicated with dashed line type for the purpose of illustration. Note that the boundary 108 also forms an outer shape of the second region 106. In various embodiments, in one state of operation of a system, the second region 106 is illuminated from a back side of the glass layer 102, thereby communicating information consisting of the letter "T" to a person viewing the glass layer 102 from the front side as shown in FIG. 1A generally at 100. In various embodiments, the second region 106 is configured with one or more letters, words, numbers, symbols, artwork or any combination thereof to communicate information to a viewer. In some embodiments, product or venue branding is contained with the information communicated to the viewer. In various hospitality or commercial environments, a hotel or motel's branding is communicated to the viewer by means of the information. Notably there is no display on which information is presented to the viewer. The information is communicated in the configuration of the boundary 108 between the first region 104 and the second region 106 within the physical structure of the glass layer 102. The boundary 108, between the first region 104 and the second region 106, can be configured in various ways as described herein. In the embodiment illustrated in FIG. 1A, the second region 106 is in the form of a solid letter "T." In other embodiments, the information communicated by a letter "T" can be accomplished with the letter "T" having an interior made from a first region 134 surrounded by a second region 136 configured as is illustrated in FIG. 1B with a boundary 140 and a boundary 142.

FIG. 1C illustrates, generally at 160, the glass surface from either FIG. 1A or FIG. 1B now configured in an "OFF" state, according to embodiments of the invention. With reference to FIG. 1C, in the OFF state, the light source located on the back side of the glass layer is powered down, thereby causing the letter "T" to vanish. Even though the reflectivity of the first region 104 is greater than the reflectivity of second region, for example, 106 or 136, the letter "T" is not visible from the front side of the glass layer 102 in FIG. 1C at 160. In other words, the viewer of the front side of the glass layer 102 does not see the letter T when the system is in the OFF state because the letter "T" has vanished into the mirror 102 in FIG. 1C.

FIG. 2A illustrates, generally at 200, a first cross-section of a glass surface configured to communicate vanishing information, according to embodiments of the invention. With reference to FIG. 2A, a glass layer 202 is shown in cross-section. The cross-sectional view illustrated in FIG. 2A is representative of a section A-A indicated at 120 in FIG. 1A. In one or more embodiments, the glass layer 202 shown in FIG. 2A is representative of the glass layer 102 shown in FIG. 1A-FIG. 1C. In FIG. 2A, a light source 204a or 204b is located behind the glass layer 202 as indicated at 220. A person 206 views the glass layer 202 from a front side 208. A reflective layer 210a/210b is located on the back side of the glass layer 202. The reflective layer 210a/210b defines the first region 212a/212b. In some embodiments, a second region 214 of the glass layer 202 does not have the reflective layer 210a/210b present. Thus, the reflectivity of the glass layer 202 is greater in the first region 212a/212b then a reflectivity of the second region 214 when viewed from the front side 208. Note that, in some embodiments, there is no reflective layer present within the second region 214 and the layer 210a/210b absorbs light instead of reflecting light, as described below in conjunction with FIG. 2B. In some embodiments, the amount of reflective layer present in the second region 214 is less than the amount of reflective layer present in the first region 212a/212b, as indicated by optional reflective layer 216. In some embodiments, a thickness of silvering is reduced in the second region 214 relative to the first region 212a/212b in order to decrease a reflectivity of the second region 214 relative to a reflectivity of the first region 212a/212b. In some embodiments, the volume represented by 220, behind the glass layer 202, is contained in a light proof volume, for example a light box 222, thereby minimizing straylight production or reflection within the light box 222 except the light generated by the light source 204a or 204b. In such an environment, the light source 204a can be located right behind the second region 214 or it can be located off to the side of the boundary (between the first and second regions), indicated at 204b. Note that one or more light sources are located behind the glass layer 202. The light sources 204a and 204b are merely examples and are not limiting. In some embodiments only one light source is used. In yet other embodiments, a plurality of light sources is used. Thus, when the light source (204a or 204b) is in an OFF state, a viewer 206, viewing the glass layer 202 from the front side, does not see a distinction (boundary) between the first region 212a/212b and the second 214. In other words, the boundary between the first region 212a/212b and the second region 214 vanishes and the information will vanish when the light source is in the OFF state. Creating a light box on a back side of a glass layer is described more fully in U.S. patent application Ser. No. 15/585,060, titled: "UNIVERSAL MIRROR TV AND FLAT PANEL DISPLAY COVER" filed on May 2, 2017, which is hereby incorporated by reference.

When the light source (204a or 204b) is in the ON state, the second region 214 is illuminated and the boundary that exists between the first region 212a/212b and the second region 214 will communicate information to the viewer 206 as described above in conjunction with FIG. 1A because of the difference in reflectivity between the first region 212a/212b and the second region 214 when viewed from the front side 208.

FIG. 2B illustrates, generally at 250, another cross-section of a glass surface configured to communicate vanishing information, according to embodiments of the invention. With reference to FIG. 2B, the optional reflective layer 216 (shown in FIG. 2A) is removed from the second region 214. In the configuration of FIG. 2B, layer 210a/210b is absorbent to light, and absorbs a very high percentage of light incident thereon and appears black to the person 206. A light box surface 222 is provided with a similar highly light absorbent surface that absorbs light incident thereon and appears black to the person 206. Configured as such, when the system is in an OFF state, and is viewed from a front side 208, the person 206 sees a nominally black surface from both the first region 212a/212b and the second region 214 with some reflection of ambient light occurring from the glass layer 202, the information contained in the mirror structure is not visible. When the system is switched to an ON state, the person 206 sees the information communicated via the boundary between the first region 212a/212b and the second region 214 because the substantially opaque light absorbent layers 210a/210b will prevent light from passing through the first region 212a/212b, while permitting light to pass through the second region 214 without absorption.

FIG. 3 illustrates, generally at 300, a second cross-section of a glass surface configured to communicate vanishing information, according to embodiments of the invention.

With reference to FIG. 3, a glass layer 302 is illustrated in cross-section. In one or more embodiments, the cross-section A-A at 120 from FIG. 1A is illustrated in FIG. 3. A user 306 views a front side 308 of the glass layer 302. The structure of the mirror includes a reflective layer 309 disposed on a front side of a glass layer 302 over both the first region 312a/312b and the second region 314. On a back side of the glass layer 302, a layer of additional material indicated at 316a/316b is placed to define the second region 314. In various embodiments, the reflective layer 309 can be a thin film or alternatively stated a coating, such as a dielectric mirror. In various embodiments, a reflective layer 309 deposited on the front side of the glass layer 302 can be deposited through various vapor deposition processes. A light source 318a or 318b is located behind the glass layer 302 as indicated at 320. Note that one or more light sources are located behind the glass layer 302 and the light sources 318a and 318b are illustrative of examples and are not limiting. In some embodiments only one light source is used. In yet other embodiments, a plurality of light sources is used.

In an "ON" state, information is communicated to the viewer 306 by configuration of the boundaries 322a/322b formed between the first region 312a/312b and the second region 314. Thus, when the boundaries 322a/322b are configured to convey information to the user 306, as described above in conjunction with FIG. 1A-1C, the user 306 can understand the information from the front side 308 of the glass layer 302. The information is contained within a configuration of the boundaries 322a/322b between the first region 312a/312b and the second region 314. In the cross-section shown in FIG. 3, the second region 314 is continuous between the left boundary 322a and the right boundary 322b, thus, the second region 314 would appear to be illuminated when viewed from a front side 308 of the mirror.

In some embodiments, additional material indicated at 316a/316b is placed on a back side of the glass layer 302 to increase a reflectivity of the first region 312a/312b relative to a reflectivity of the second region 314. When viewed from the front side 308 of the glass layer 302, a reflectivity of the first region 312a/312b is greater than a reflectivity of the second region 314 because the additional material 316a/316b increases the reflectivity of the first region 312a/312b, thereby creating boundaries 322a/322b that can be configured for the communication of information to the viewer 306, who views the front side 308 of the glass layer 302.

Note that when the light source(s) 318a or 318b is an OFF state, the left boundary 322a and the right boundary 322b disappear thereby causing the second region 314 and first region 312a/312b to merge. Thus, the information presented by the boundaries vanishes into the mirror when the light source(s) is in the OFF state.

Figure 4:
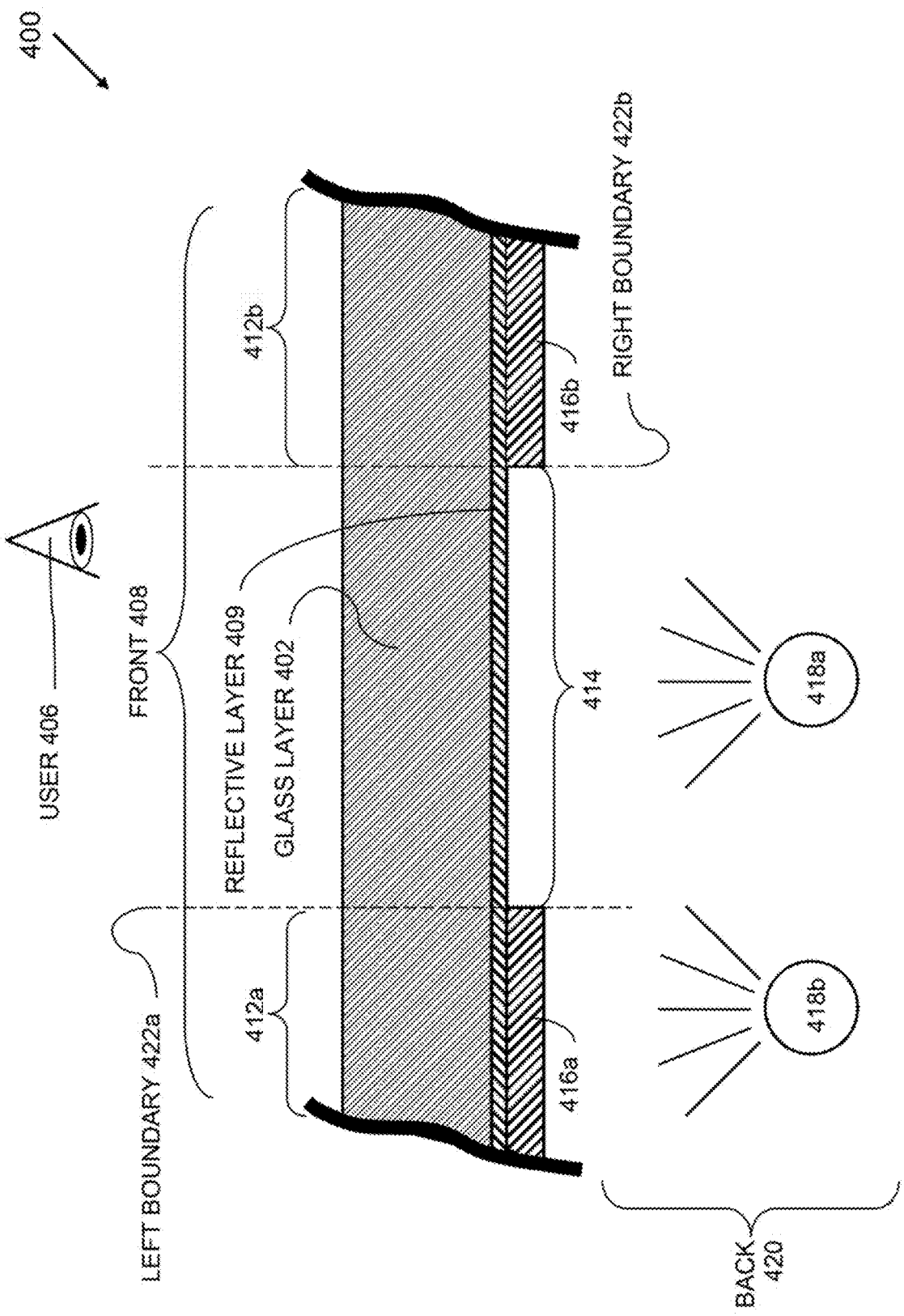
FIG. 4 illustrates a third cross-section of a glass surface configured to communicate vanishing information, according to embodiments of the invention.

FIG. 4 illustrates, generally at 400, a third cross-section of a glass surface configured to communicate vanishing information, according to embodiments of the invention. With reference to FIG. 4, the cross-sectional view presented in FIG. 4 is used in various embodiments as the mirror structure that is used to provide the front view of the glass layer illustrated in FIG. 1A-FIG. 1C. Thus, in one or more embodiments, the cross-section A-A at 120 from FIG. 1A is illustrated in FIG. 4. As illustrated herein, a glass layer 402 has a front side indicated at 408 and a back side indicated at 420. The front side 408 is viewable by a person 406 and the back side 420 is configured for illumination by a light source, such as 418a, 418b, etc. Note that one or more light sources are located behind the glass layer 402. The light sources 418a and 418b are illustrative of examples and are not limiting. In some embodiments only one light source is used. In yet other embodiments, a plurality of light sources is used. A system in which the glass layer 402 is configured for use has at least two states, an ON state and an OFF state.

In one or more embodiments, a reflective layer 409 is disposed on a back side of a glass layer 402. In some embodiments, the reflective layer 409 is a layer of silvering or silver paint. In some embodiments, the reflective layer is a thin film or alternatively stated a coating. In some embodiments, the thin film is a dielectric mirror layer. In various embodiments, the reflective layer 409 is disposed over both a first region 412a/412b and a second region 414.

A layer of additional material 416a/416b is disposed behind the reflective layer 409 thereby defining the first region 412a/412b, such that a reflectivity of the first region 412a/412b is greater than a reflectivity of the second region 414. This difference in reflectivity results because the reflectivity of the first region 412a/412b is increased by the presence of the additional material 416a/416b. The additional material 416a/416b substantially prevents transmission of light from the front side 408 of the glass layer 402 to the back 420 of the glass layer 402, thereby increasing a reflectivity of the first region 412a/412b. In some embodiments, the additional material 416a/416b is a layer of paint that reduces transmission of light, such as a layer of opaque paint such black paint. Such a layer is referred to in the art as a backing layer. In other embodiments, an additional layer of material is a layer of metal, e.g., copper, etc. Thus, the additional material 416a/416b can be made with one or more additional layers of different materials or one or more materials such as coatings and/or sheets. Those of ordinary skill in the art will realize that embodiments of the invention are applicable to any type of mirror and corresponding mirror structure. No limitation is implied by the specific examples of mirrors provided herein. For example, in some mirror manufacture, aluminum is used in place of silver to provide reflectivity by means of a silvered layer. In some mirror structures, silver paint is used to provide at least a part of the reflectivity of a glass layer.

In some embodiments, the additional material 416a/416b is implemented with a removable layer of material such as a layer of metal, a layer of plastic, a layer of cardboard, etc.

In various embodiments, the mirror structure illustrated in FIG. 4 is made in a variety of different ways. For example, in one or more embodiments, a backing layer is selectively removed using a laser, thereby exposing the reflective layer to the light source. In some embodiments, part of the reflective layer can be removed with the laser, thereby decreasing a reflectivity of a particular region. Selective removal of a backing layer using a laser is described more fully in U.S. patent application Ser. No. 15/152,223, titled: "APPARATUSES AND METHODS FOR PROVIDING A VANISHING VIEWING WINDOW WITHIN A MIRROR," filed on May 11, 2016, which is hereby incorporated by reference. In yet other embodiments, the additional material 416a/416b is deposited onto the reflective layer 409 by masking the second region 414 before application of the additional material 416a/416b to create the first region 412a/412b. A layer of additional material 416a/416b can be applied in the form of paint or other coating.

In all of the various ways in which a first region and a second region are formed, a boundary between the first region and the second region is configured to convey information to a viewer of a front side of a glass layer. In other words, the information is defined within the mirror structure and is contained within a geometry of a boundary, e.g., a left boundary 422a and a right boundary 422b between, for example, the first region 412a/412b and the second region 414 that exists because of a difference in reflectivity between the two regions of the mirror structure. Embedded within the structure of the mirror, the information is selectively displayed to a viewer or rendered invisible by illumination of a back side of the glass layer 402.

Various differences in magnitude between of the reflectivity of two adjacent regions will create a boundary with which information can be stored in the mirror structure. Embodiments of the invention are not limited by a particular difference in reflectivity between a first region and an adjoining second region. What constitutes a discernible difference in reflectivity to a viewer of a glass layer will be influenced by such variables as; ambient light level in a location in which a glass layer is viewed, intensity of a light source contained on a back side of the glass layer, interior surface treatment of a light box (when provided as described in conjunction with FIG. 2A-2B above), absolute value of the reflectivity of the first region, the second region, etc.

Provided merely for illustration, and with no limitation implied thereby, a difference in reflectivity between a first region and a second region (the second region is defined as the region having a reflectivity that is reduced relative to a reflectivity of the first region) can be as small as 1% to 2% or even a fraction of 1% and still convey information to a viewer through a discernable boundary, when the reflectivity of Region #1 is 100% or nearly 100%. A reflectivity of 100% or nearly 100% for the first region is achieved with an additional material placed behind a reflective layer, such as a silvered layer, where the additional material is in the form of an opaque backing layer or an opaque metal layer. In other embodiments, the difference in reflectivity between the first region and the second region can be much larger than 1% and can even approach in some embodiments 100% with a light box configuration on a back side of a glass layer. Thus, all differences in reflectivity that result in a boundary that is observable to a viewer are taught and contemplated within various embodiments of the invention. In some embodiments, using a mirror created with a reflective layer of silvering or silver paint, for the reduced reflectivity region (the second region), and a backing layer added to the reflective layer of silvering or silver paint plus an additional layer of opaque material such as paint or copper results in a difference in reflectivity of approximately 1% to 2% where an absolute value of the reflectivity of one region is approximately 100% (higher reflectivity region–the first region) and an absolute value of the adjacent lower reflectivity region is approximately 98%-99% (the second region). These values are provided merely for illustration of one or more embodiments and do not limit other embodiments of the invention.

Note that in some embodiments, a mirror structure is configured by combining two or more of the cross-sectional constructions described above in FIGS. 2A, FIG. 2B, FIG. 3, and FIG. 4. For example, in one or more embodiments, a continuous glass layer is constructed to contain an area that has a cross-section as taught in FIG. 2B, where the light absorbent layer (210a/210b) and surface 222 provides a substantially black light box for display of first information thereon with a first light source. A second segment of the continuous glass layer is made with a cross-sectional that follows the construction of one or more of FIG. 2A, FIG. 3, or FIG. 4, thereby appearing as a reflective mirror that allows second information to both appear and to disappear according to a state of a light source configured for use therein.

Figure 5:
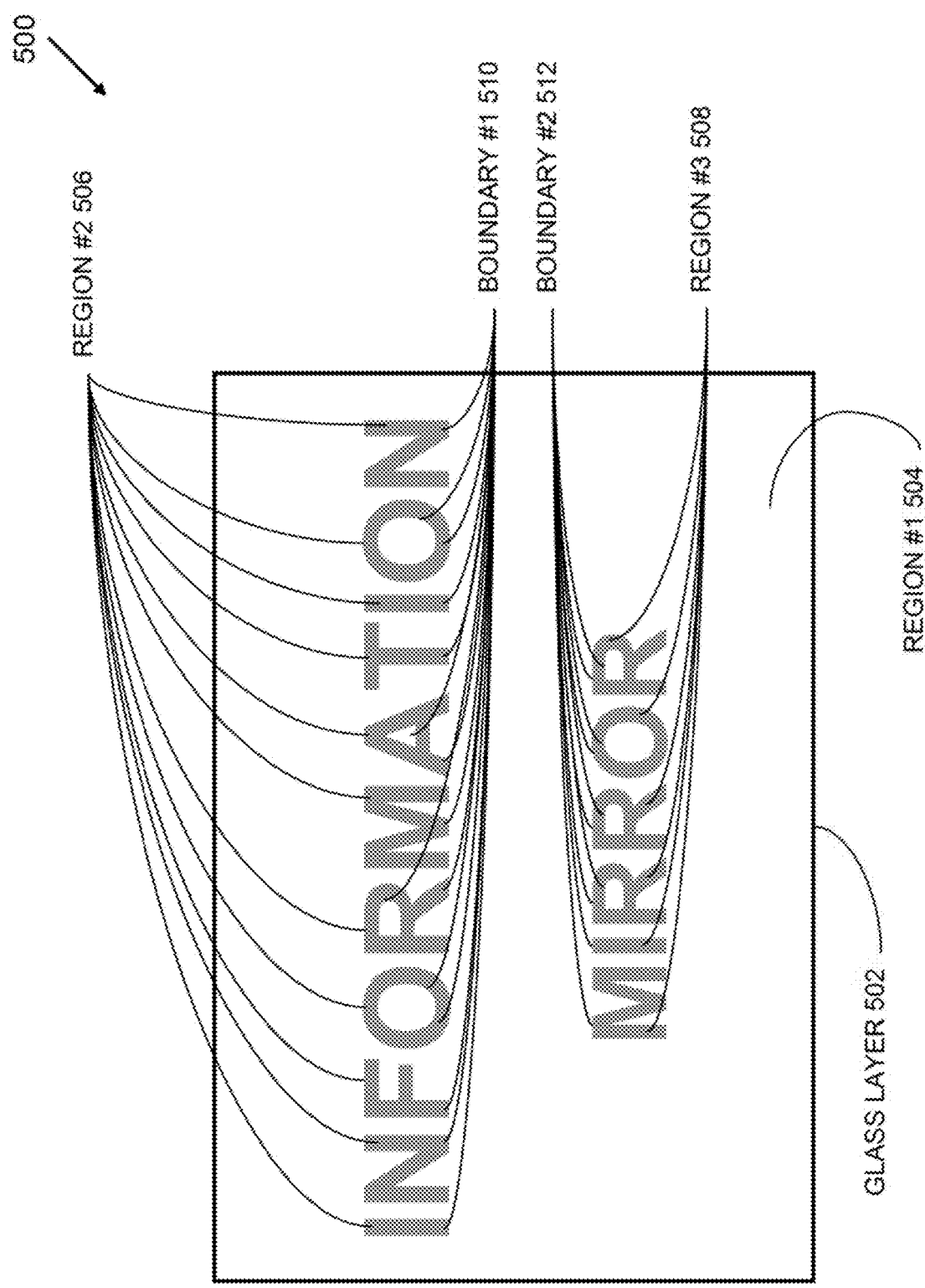
FIG. 5 illustrates multiple boundaries configured to convey information, according to embodiments of the invention.

FIG. 5 illustrates, generally at 500, multiple boundaries configured to convey information, according to embodiments of the invention. With reference to FIG. 5, a glass layer 502 is illustrated in front view with the system in an ON state such that a second region 506 and a third region 508 are illuminated (by a light source such as described above) and visible to a viewer. A surface area of the glass layer contains a first region 504, the second region 506, and the third region 508. Together, the first region 504, the second region 506, and the third region 508 makeup the surface area of the glass layer 502 that is visible to a viewer of the front side of the glass layer 502.

A reflectivity of the first region 504 is greater than a reflectivity of the second region 506, this is accomplished by creating a difference in the mirror structure as described above in conjunction with the preceding figures. Likewise, a reflectivity of the first region 504 is greater than a reflectivity of the third region 508. The reflectivity of the second region 506 and the reflectivity of the third region 508 can vary from being the same as or substantially the same as the reflectivity of the first region 504 to slightly less than the reflectivity of the first region 504. The reflectivity of the second region 506 and the reflectivity of the third region 508 can be made the same or substantially similar in some embodiments or there can be variation between the two reflectivities in other embodiments depending on a desired appearance for the glass layer 502.

The word "INFORMATION" is displayed on FIG. 5 and is conveyed to a viewer of the front side of the glass layer 502. As described above, a boundary 510 between the first region 504 and the second region 506 has been configured to contain the letters of the word "INFORMATION." The boundary 510 includes the outlines of the letters of the word "INFORMATION" created in the structure of the mirror. As shown in FIG. 5, the second region 506 is a plurality of portions of the glass layer 502 that have a reduced reflectivity relative to the reflectivity of the first region 504. Configured as such, the second region 506 displays the word "INFORMATION" to a viewer when the viewer observes the glass layer 502 from a front side when the system is in the ON state. When the system is in the OFF state, the word "INFORMATION" vanishes, and the viewer sees a reflection in the second region 506 that appears substantially the same as the reflection observed from the first region 504. As used in this description of embodiments, a reflection that appears substantially the same means a reflection that can span a range from exactly the same to a reflection that is close enough so as to render the information unintelligible.

The word "MIRROR" is displayed on FIG. 5 and is conveyed to a viewer of the front side of the glass layer 502. As described above, a boundary 512 between the first region 504 and the third region 508 has been configured to contain the letters of the word "MIRROR." As shown in FIG. 5, the third region 508 is a plurality of portions of the glass layer 502 that have a reduced reflectivity relative to the reflectivity of the first region 504. Configured as such, the third region 508 displays the word "MIRROR" to a viewer when the viewer observes the glass layer 502 from a front side when the system is in the ON state. When the system is in the OFF state, the word "MIRROR" vanishes, and the viewer sees a reflection in the third region 508 that appears substantially the same as the reflection observed in the first region 504.

Figure 6:
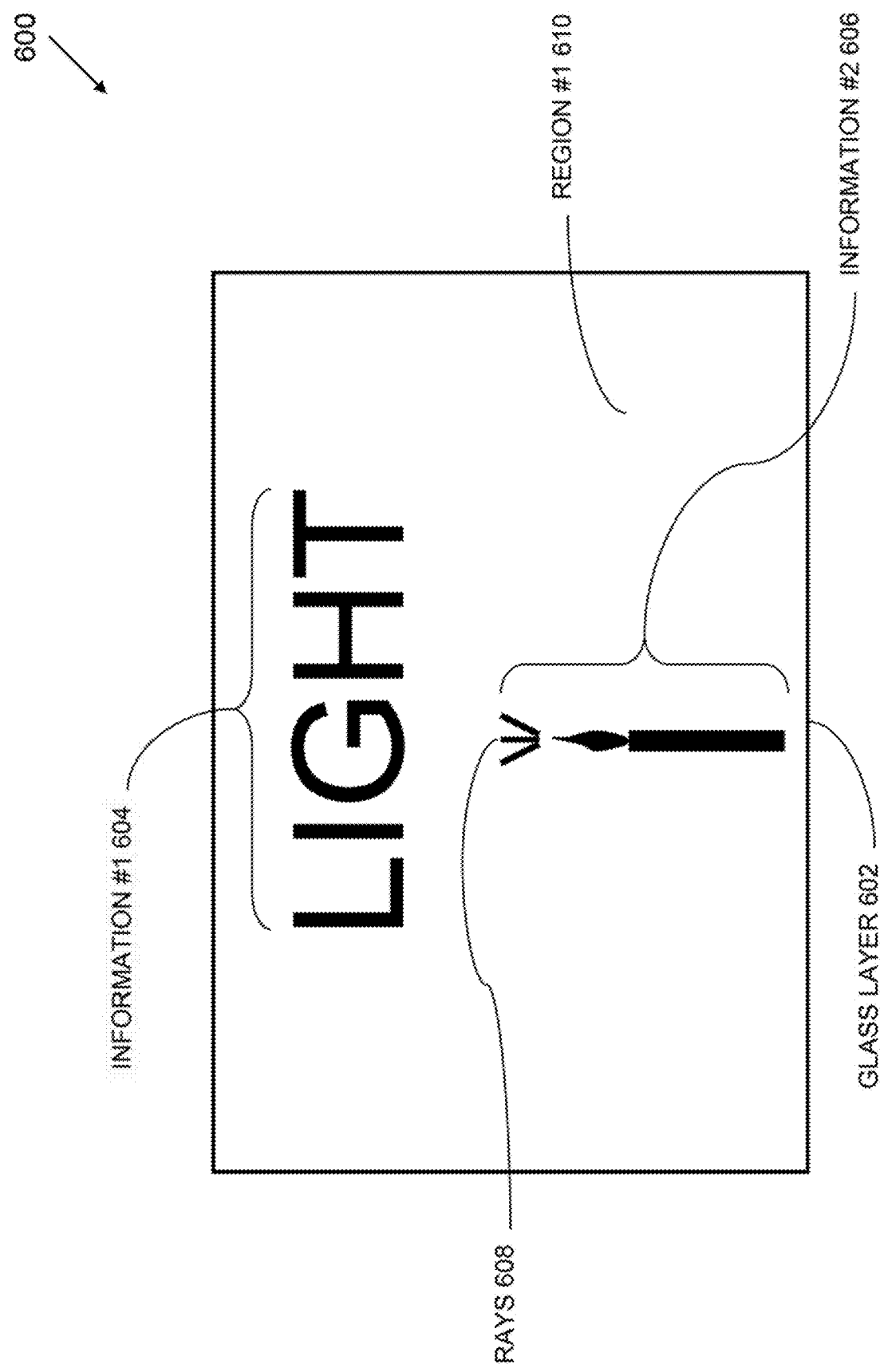
FIG. 6 illustrates boundaries configured to convey information with both text and symbols, according to embodiments of the invention.

FIG. 6 illustrates, generally at 600, boundaries configured to convey information with both text and symbols, according to embodiments of the invention. The system shown in FIG. 6 is in an ON state, therefore information #1 at 604 displayed on a glass layer 602 is the word "LIGHT" and is visible to a viewer on a front side of the glass layer 602. The word "LIGHT" is an example of information in the form of text or alternatively stated letters. Information can also be presented in the form of numbers, symbols, or artwork. Information #2 at 606 is an example of communicating information with a symbolic image that also contains an example of artwork. The symbolic image/artwork is a representation of a candle in silhouette form with rays at 608. When the system is in the "ON" state, the information #1 at 604 and the information #2 at 606/608 are visible to a user viewing the front side of the glass layer 602 as illustrated in FIG. 6. When the system is in an "OFF," state the information #1 at 604 and the information #2 at 606/608 disappears into the glass layer 602 and the user sees a uniform reflection as if the entire glass layer 602 were made with a mirror having a reflectivity given by a first region as indicated at 610.

Display Sequences

Figure 7:
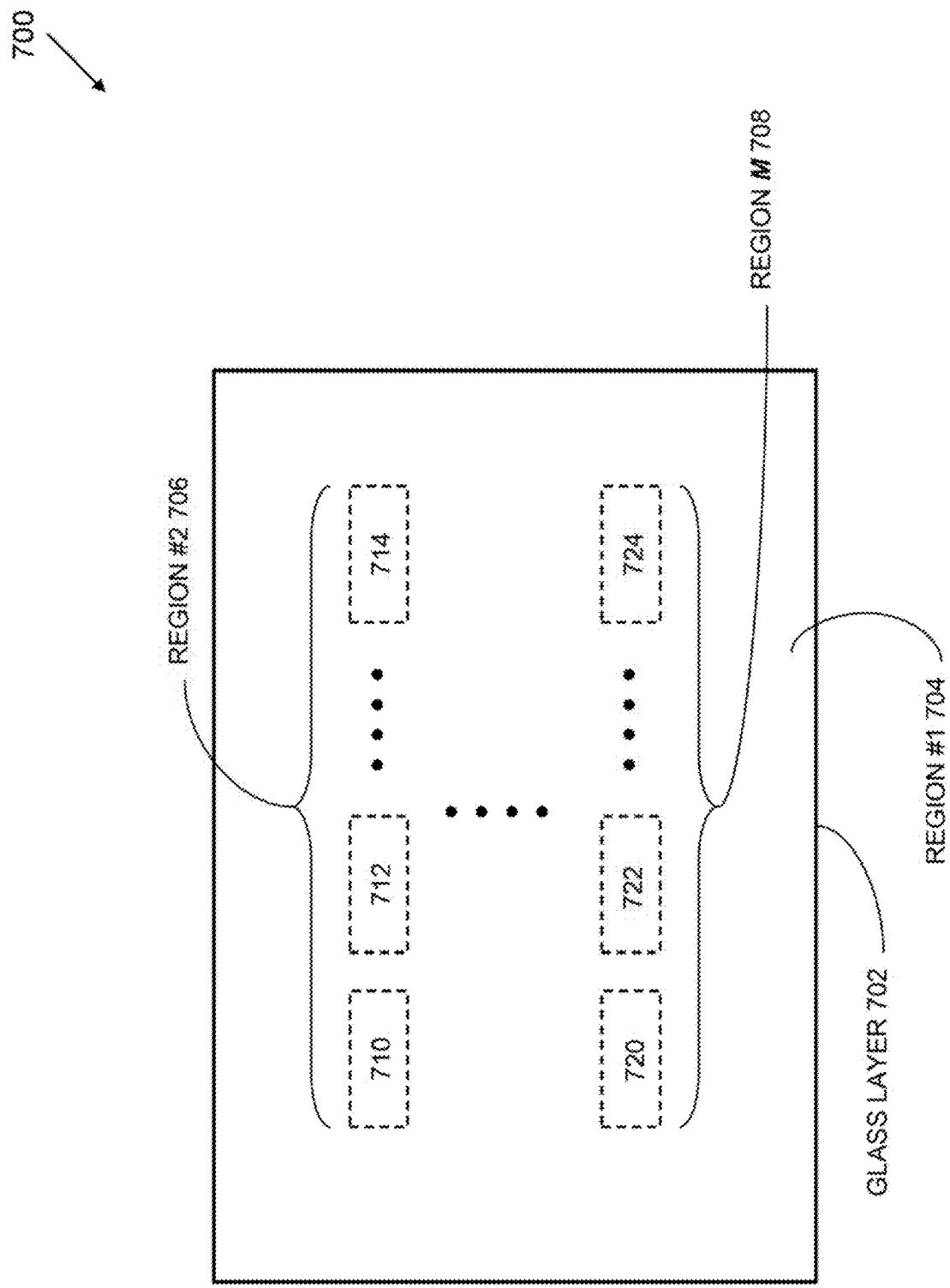
FIG. 7 illustrates a general number of regions configured to convey information, according to embodiments of the invention.

FIG. 7 illustrates, generally at 700, a general number of regions configured to convey information, according to embodiments of the invention. With reference to FIG. 7, a glass layer 702 is illustrated with a general number of regions (M) indicated by a second region 706 . . . a general Mth region indicated at 708. As described above, a first region 704 has greater reflectivity than any of the second regions 706 through the Mth region at 708. The second region 706 is made up of a general number of N portions, a plurality of portions, given by a first portion 710, a second portion 712 . . . portion n at 714. Similarly, the Mth region is made up of a plurality of portions, i.e., a first portion 720, a second portion 722 . . . portion p at 724. Each region of the M regions 708 can be configured with its own unique number of portions. Or two or more regions can have the same number of portions. In various embodiments, portions can be illuminated according to a sequence in time. In one or more embodiments all of the portions are not displayed at the same time but are sequenced in time or "rolled out sequentially" for display by successive illumination performed by individually controlled light sources. For example, referring to the second region 706, according to one display sequence, the portion 710 is displayed first in time, followed by the portion 712 displayed later in time, and so on up to the portion n at 714 displayed after portion n−1. A portion as used in this description of embodiments refers to less than the whole of the information displayed in a given region.

For example, in one embodiment, illustrated with reference to FIG. 6 and information #1 604, a first portion can be represented by the letter "L," a second portion can be represented by the letter "I," a third portion can be represent by the letter "G," a fourth portion can be represented by the letter "H," and a fifth portion be represented by the letter "T." Alternatively, in various embodiments, the letters can be grouped differently into portions such as a first portion "LI," a second portion "GH," and a third portion "T." In one sequence for display, each portion is illuminated sequentially one after the other from left to right with each portion remaining illuminated. Alternatively, in various embodiments, a display sequence follows an ON/OFF cycling of light sources where the L is illuminated for a hold time t then illumination for the L is turned OFF, then the I is illuminated for a hold time t then illumination for the I is turned OFF and this pattern continues for letters G, H, T and then cycles back to illuminating the letter L. Thus, a sequencing through the portions of the information in a region is accomplished according to various embodiments.

In other embodiments, sequencing is performed on a region-by-region basis. Where, for example, the information in a first region is illuminated first, then after a hold time t the information in a second region is illuminated. Various combinations of sequencing are accomplished either on a portion-by-portion basis within a region or on a region-by-region basis. Alternatively, the sequencing can be a combination of portion-by-region basis.

For an example of sequencing on a portion-by-region basis, consider the information displayed in FIG. 6. In an ON state for a system, in one or more embodiments, a sequence unfolds in the following order, all letters of the word "LIGHT," labeled as information #1 at 604, are illuminated simultaneously by one or more light sources placed on a back side of a glass layer, such as 602. Then, while the word "LIGHT" is still illuminated, the rays of the candle 608, symbolic information from information #2 at 606 are illuminated. Then, after a time t passes, the rays 608 begin to blink (the system cycles the light sources behind the rays ON then OFF repeatedly to facilitate blinking). Various other sequences are possible, these sequences are given merely for illustration and do not limit embodiments of the invention.

Figure 8A:
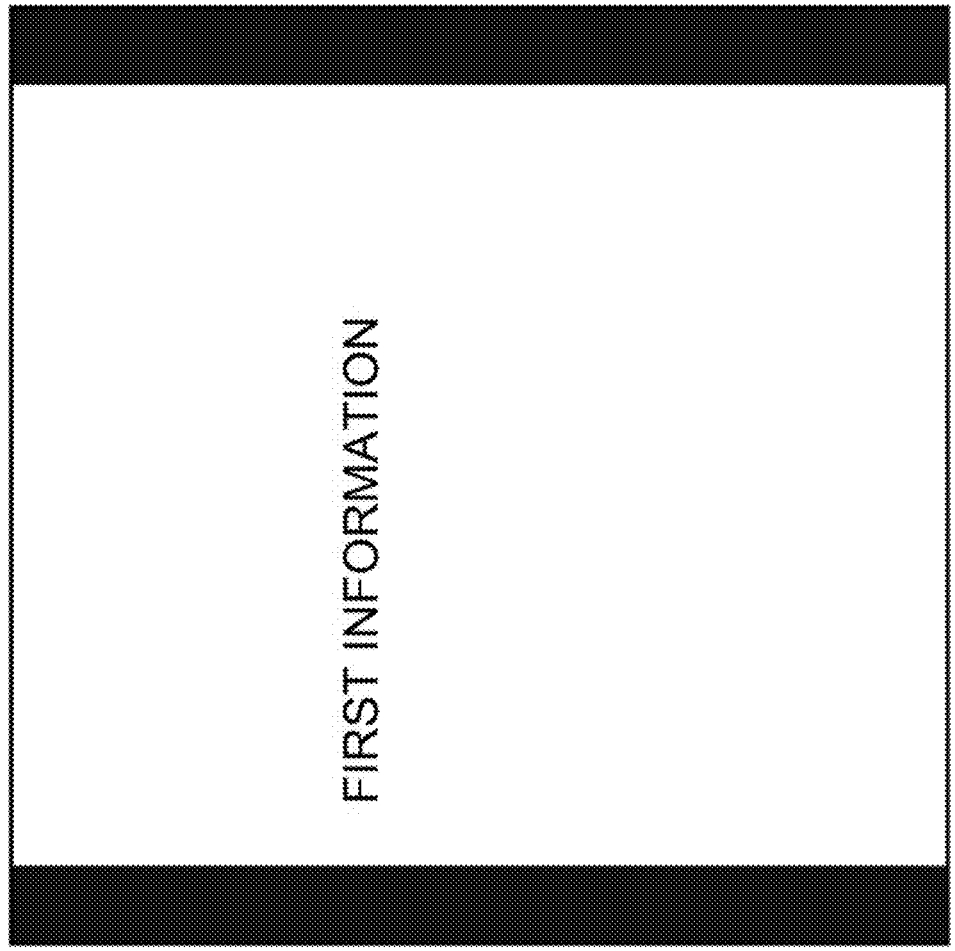
FIG. 8A-8B illustrates two regions configured to convey information, according to embodiments of the invention.
Figure 8B:
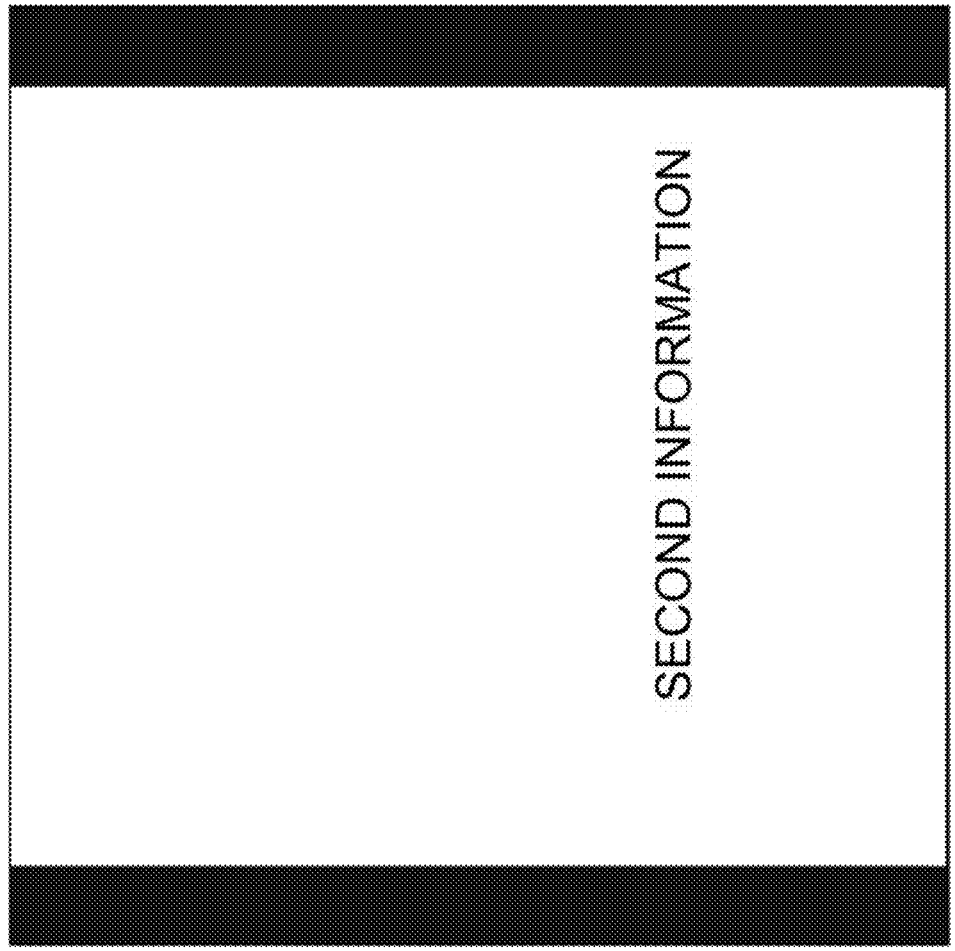

FIGS. 8A-B illustrates two regions configured to convey information, according to embodiments of the invention. With reference to FIG. 8A and FIG. 8B collectively, information in a first region is illustrated with the words "FIRST INFORMATION" and information in a second region is illustrated with the words "SECOND INFORMATION." In the example of FIG. 8A-FIG. 8B, FIG. 8A is a result of the system ON state at a first instant in time where the first region is visible to a viewer of a front side of a glass layer and the second region is not visible. At a later time, t+Δt, FIG. 8B is an example of what the viewer sees. In FIG. 8B, the second region is visible, and the first region is not visible. In order to accomplish turning light sources on and off a controller module is electrically coupled to light sources to turn the light sources on, off, or to vary their intensity or color as a function of time. In various embodiments, creating control signals to turn light sources on or off, to modulate an intensity of a light source, or to change a color temperature of a light source are all described more fully in U.S. patent application Ser. No. 15/614,617, titled: "SYSTEMS AND METHODS FOR CHANGING A COLOR TEMPERATURE OF A LIGHT," filed on May 24, 2017, which is hereby incorporated by reference.

Figure 9:
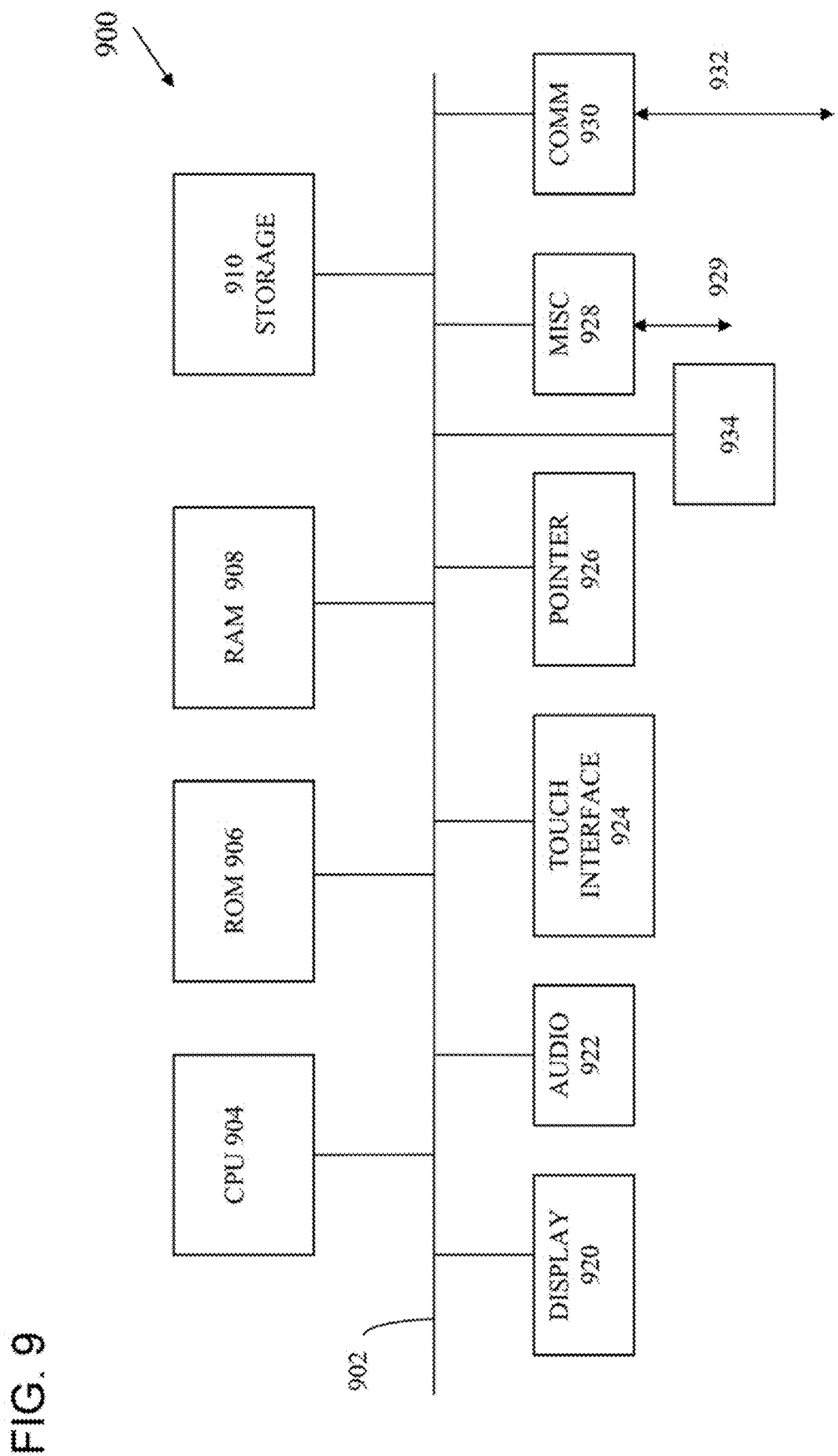
FIG. 9 illustrates a block diagram of a computing module or a communications module, according to embodiments of the invention.

FIG. 9 illustrates a block diagram of a controller module, computing module or a communications module, according to embodiments of the invention. With reference to FIG. 9, as used in this description of embodiments, a controller module, a computing module, or a communications module can be based on a device such as a microprocessor or a computer, in which embodiments of the invention may be used. The block diagram is a high-level conceptual representation and may be implemented in a variety of ways and by various architectures. Bus system 902 interconnects a Central Processing Unit (CPU) 904 (alternatively referred to herein as a processor), Read Only Memory (ROM) 906, Random Access Memory (RAM) 908, storage 910, display 920, audio, 922, touch interface 924, pointer 926, miscellaneous input/output (I/O) devices 928, and communications 930. 934 represents a controller for a device such as a physical phenomenon device, 934 can represent any number of different controllers used with the devices described herein, such as, but not limited, to pulse width modulation (PWM), etc. RAM 908 can also represent dynamic random access memory (DRAM). It is understood that memory (not shown) can be included with the CPU block 904. The bus system 902 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 994 (FireWire), Universal Serial Bus (USB), universal asynchronous receiver-transmitter (UART), serial peripheral interface (SPI), inter-integrated circuit (I2C), etc. The CPU 1904 may be a single, multiple, or even a distributed computing resource. Storage 910 may be Compact Disc (CD), Digital Versatile Disk (DVD), hard disks (HD), solid state disk (SSD), optical disks, tape, flash, memory sticks, video recorders, a redundant array of independent disks (RAID), etc. Note that depending upon the actual implementation of a controller module, a computing module, or a communications module the controller module, the computing module or the communications module may include some, all, more, or a rearrangement of components in the block diagram. For example, in the embodiments presented herein, a display is not required in order to present information to a viewer of a mirror with one or more vanishing viewing windows, i.e., regions configured to communicate information to a viewer within a configuration of a boundary between two regions having different reflectivities, when a system is in an ON state and then in an OFF state the information vanishes into the mirror. Thus, many variations on the system of FIG. 9 are possible.

Connection with a network is obtained with 932 via 930 either wirelessly or through a wired connection, as is recognized by those of skill in the art, which enables the module 900 to communicate with voice-to-text artificial intelligence (VTAI) systems which can be in remote locations for example cloud based. 932 and 930 or 928 and 929 flexibly represent communication elements in various implementations, and can represent various forms of telemetry, GPRS, Ethernet, Wide Area Network (WAN), Local Area Network (LAN), Internet connection, WiFi, WiMax, ZigBee, Infrared, etc. and combinations thereof. In various embodiments, a touch interface is optionally provided at 924.

In various embodiments, depending on the hardware configuration different wireless protocols are used in the networks to provide the systems described in the figures above. One non-limiting embodiment of a technology used for wireless signal transmission is the Bluetooth wireless technology standard which is also commonly known as IEEE 802.15.1 standard. In other embodiments, the wireless signal transmission protocol known as WiFi is used which uses the IEEE 802.11 standard. In other embodiments, the ZigBee communication protocol is used which is based on the IEEE 802.15.4 standard. These examples are given merely for example and do not limit different embodiments. Transmission Control Protocol (TCP) and Internet Protocol (IP) are also used with different embodiments. In yet other embodiments, one or more cellular telephone network protocols are used to facilitate wireless communication with a mirror. These cellular telephone network protocols include, but are not limited to; 1X, 2G, 3G, LTE, LTE-A, 4G LTE, 4G, 5G, etc. Embodiments are not limited by the data communication protocols listed herein and are readily used with other data communication protocols not specifically listed herein.

For purposes of discussing and understanding the different embodiments, it is to be understood that various terms are used by those knowledgeable in the art to describe techniques and approaches. Furthermore, in the description, for purposes of explanation, numerous specific details are set forth in order to provide a thorough understanding of an embodiment. It will be evident, however, to one of ordinary skill in the art that an embodiment may be practiced without these specific details. In some instances, well-known structures and devices are shown in block diagram form, rather than in detail, in order to avoid obscuring various embodiments. These embodiments are described in sufficient detail to enable those of ordinary skill in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are the means used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

An apparatus for performing the operations herein can implement the present invention. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk-read only memories (CD-ROMs), and magnetic-optical disks, read-only memories (ROMs), random access memories (RAMs), dynamic random access memories (DRAM), electrically programmable read-only memories (EPROM)s, electrically erasable programmable read-only memories (EEPROMs), FLASH memories, magnetic or optical cards, RAID, etc., or any type of media suitable for storing electronic instructions either local to the computer or remote to the computer.

The algorithms and displays presented herein are not inherently related to any particular computer or other apparatus. Various general-purpose systems may be used with programs in accordance with the teachings herein, or it may prove convenient to construct more specialized apparatus to perform the required method. For example, any of the methods according to the embodiments can be implemented in hard-wired circuitry, by programming a general-purpose processor, or by any combination of hardware and software. One of ordinary skill in the art will immediately appreciate that the embodiments can be practiced with computer system configurations other than those described, including hand-held devices, multiprocessor systems, microprocessor-based or programmable consumer electronics, digital signal processing (DSP) devices, set top boxes, network PCs, minicomputers, mainframe computers, and the like. The embodiments can also be practiced in distributed computing environments where tasks are performed by remote processing devices that are linked through a communications network.

The methods herein may be implemented using computer software. If written in a programming language conforming to a recognized standard, sequences of instructions designed to implement the methods can be compiled for execution on a variety of hardware platforms and for interface to a variety of operating systems. In addition, the embodiments are not described with reference to any particular programming language. It will be appreciated that a variety of programming languages may be used to implement the teachings of the embodiments as described herein. Furthermore, it is common in the art to speak of software, in one form or another (e.g., program, procedure, application, driver, ... ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical representation in at least hardware and/or software (such as a computer system in which the techniques of the present invention may be practiced as well as implemented as an embodiment).

Non-transitory machine-readable media is understood to include any mechanism for storing information (such as program code, etc.) in a form readable by a machine (e.g., a computer). For example, a machine-readable medium, synonymously referred to as a computer-readable medium, includes read only memory (ROM); random access memory (RAM); magnetic disk storage media; optical storage media; flash memory devices; except electrical, optical, acoustical or other forms of transmitting information via propagated signals (e.g., carrier waves, infrared signals, digital signals, etc.); etc.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

While the invention has been described in terms of several embodiments, those of skill in the art will recognize that the invention is not limited to the embodiments described but can be practiced with modification and alteration within the spirit and scope of the appended claims. The description is thus to be regarded as illustrative instead of limiting.

What is claimed is:

1. A mirror apparatus to convey information to a user, comprising:
    a glass layer, the glass layer has a front side and a back side, the glass layer further comprising:
        a first region, the first region has a first reflectivity; and
        a second region; the second region has a second reflectivity wherein the first reflectivity is greater than the second reflectivity; and
        a first boundary, the first boundary exists where the first region meets the second region and the first boundary is shaped to convey information when the second region is illuminated from the back side, when the second region is not illuminated from the back side,
            a. and b. occur;
            a. the first region and the second region provide substantially the same reflection when the glass layer is viewed from the front side by the user; and
            b. the first boundary does not convey information.

2. The apparatus of claim 1, wherein a cross-section of the glass layer in the first region, further comprising:
    an additional material.

3. The apparatus of claim 2, wherein the additional material is a backing layer.

4. The apparatus of claim 3, wherein the backing layer is a layer of opaque material.

5. The apparatus of claim 4, wherein the layer of opaque material is removable.

6. The apparatus of claim 5, wherein the layer of opaque material is selected from the group consisting of cardboard, plastic, vinyl, metal, paper, a user selected material.

7. The apparatus of claim 3, wherein the backing layer is a layer of paint applied to the additional material.

8. The apparatus of claim 2, wherein the first boundary is not visible from the front side when the second region is not illuminated from the back side.

9. The apparatus of claim 2, wherein the information exists in a form selected from the group consisting of letters, numbers, symbols, letters and numbers, letters and symbols, numbers and symbols, a silhouette of an object, artwork and any combination of the preceding.

10. The apparatus of claim 9, further comprising:
    a source of light, the source of light is position on the back side, and is operable between at least two states, a first state is an OFF state and a second state is an ON state, wherein in the ON state, the information is visible when the user views the glass layer from the front side and in the OFF state, the Information is not visible when the user views the glass layer from the front side.

11. The apparatus of claim 10, wherein the source of light is a plurality of solid-state light elements.

12. The apparatus of claim 11, wherein the plurality of solid-state light elements are light emitting diodes (LEDs).

13. The apparatus of claim 2, further comprising:
    a third region, the third region has a third reflectivity wherein the first reflectivity is greater than the third reflectivity; and
    a second boundary, the second boundary exists where the first region meets the third region and the second boundary is shaped to convey information when the third region is illuminated from the back side, when the third region is not illuminated from the back side, c. and d. occur;
- c. the first region and the third region provide substantially the same reflection when the glass layer is viewed from the front side by the user; and
- d. the third boundary does not convey information.

14. The apparatus of claim 1, wherein the first reflectivity and the second reflectivity are created with silvering.

15. The apparatus of claim 1, wherein at least a part of the first reflectivity and at least a part of the second reflectivity are created with a coating and the coating is applied to a side selected from the group consisting of a front side and a back side.

16. The apparatus of claim 15, wherein the coating is a dielectric mirror.

17. A system to communicate Information to a user, comprising:
    a glass layer, the glass layer has a front side and a back side, the glass layer is partitioned into a first region and at least a second region, wherein a reflectivity of the first region is greater than a reflectivity of the second region and a first boundary between the first region and the second region is configured to provide Information to the user when the second region is illuminated from the back side, when the second region is not illuminated or substantially not illuminated from the back side the first boundary does not provide information;
    a first light source, the first light source is located on the back side and is configured to receive control signals and to provide illumination to the second region; and
    a controller module, the controller module is electrically coupled to the first light source and is configured to send control signals to the first light source, thereby creating at least two states, an ON state and an OFF state, in the OFF state the second region provides a reflection to the user which is substantially the same as the reflection from the first region.

18. The system of claim 17, wherein the controller module executes a lighting sequence in the following order:
    1. a first portion of the second region is illuminated and remains illuminated; and
    2. after a time delay, measured from illumination of the first portion, a second portion of the second region is illuminated.

19. The system of claim 18, wherein during illumination of the first portion, an intensity of the first light source is gradually increased as a function of time.

20. The system of claim 19, wherein during illumination of the second portion, the Intensity of the first light source is gradually Increased as a function of time.

21. The system of claim 19, wherein following illumination of the first portion, the Intensity of the first light source is gradually decreased as a function of time.

22. The system of claim 19, wherein following illumination of the second portion, the intensity of the first light source is gradually decreased as a function of time.

23. The system of claim 17, further comprising:
    a third region, the third region has a reflectivity that is substantially the same as the reflectivity of the second region, and a second boundary between the first region and the third region is configured to provide information to the user when the third region is illuminated from the back side, when the third region is not illuminated or substantially not illuminated from the back side, a. and b. occur;
    a. the second boundary does not provide information; and
    b. the third region provides a reflection to the user which is substantially the same as the reflection provided from the first region.

24. The system of claim 23, further comprising:
    a second light source, the second light source is configured to receive control signals from the controller module and to emit light on the back side in the third region, the emitted light has a second color temperature.

25. The system of claim 24, wherein a first color temperature of the first light source and the second color temperature are different.

26. The system of claim 24, wherein a first color temperature of the first light source and the second color temperature are the same.

27. The system of claim 17, wherein the Information exists in a form selected from the group consisting of letters, numbers, symbols, letters and numbers, letters and symbols, numbers and symbols, a silhouette of an object, artwork, and any combination of the preceding.

28. A method to embed Information Into a mirror, comprising:
    creating a difference in an optical property within a structure of the mirror, wherein a first region is created with a first optical property and a second region is created with a second optical property;
    creating a boundary between the first region and the second region, wherein the boundary defines a first Information; and
    providing a source of backlight positioned to illuminate a back side of the mirror, in an ON state a user can view the first information on a front side of the mirror and in an OFF state the first information disappears.

29. The method of claim 28, further comprising:
    controlling the source of backlight as function of time.

30. The method of claim 29, wherein the controlling sequences through at least two regions.

31. The method of claim 28, wherein one of the first region and the second region is further comprised of a plurality of portions and the controlling sequences through the plurality of portions as a function of time.

32. The method of claim 28, wherein the first optical property is a first reflectivity and the second optical property is a second reflectivity, the first reflectivity is substantially the same as the second reflectivity.

33. The method of claim 28, wherein the first optical property is a first light absorption value and the second optical property is a second light absorption value, the first light absorption value is greater than the second light absorption value.

* * * * *